United States Patent
Hamada et al.

(10) Patent No.: US 11,710,983 B2
(45) Date of Patent: Jul. 25, 2023

(54) ELECTRIC POWER SYSTEM AND SERVER

(71) Applicant: TOYOTA JIDOSHA KABUSHIKI KAISHA, Toyota (JP)

(72) Inventors: Shigetaka Hamada, Nisshin (JP); Haruka Hirose, Toyota (JP); Yusuke Horii, Nagoya (JP); Toru Nakamura, Toyota (JP); Takaaki Sano, Izumi (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 72 days.

(21) Appl. No.: 17/526,430

(22) Filed: Nov. 15, 2021

(65) Prior Publication Data

US 2022/0200336 A1    Jun. 23, 2022

(30) Foreign Application Priority Data

Dec. 23, 2020 (JP) .................................. 2020-213628

(51) Int. Cl.
*H02J 13/00* (2006.01)
*G05F 1/66* (2006.01)
*G06Q 50/06* (2012.01)

(52) U.S. Cl.
CPC .......... *H02J 13/00028* (2020.01); *G05F 1/66* (2013.01); *G06Q 50/06* (2013.01); *H02J 13/00034* (2020.01)

(58) Field of Classification Search
None
See application file for complete search history.

(56) References Cited

U.S. PATENT DOCUMENTS 8,766,474 B2 * 7/2014 Carralero ............... H02J 3/381
307/65
2015/0076903 A1    3/2015 Kanayama et al.

FOREIGN PATENT DOCUMENTS

CN    106961121 A    7/2017
JP    2020-028198 A    2/2020

* cited by examiner

*Primary Examiner* — Mohammad Ali
*Assistant Examiner* — Saad M Kabir
(74) *Attorney, Agent, or Firm* — Finnegan, Henderson, Farabow, Garrett & Dunner, LLP

(57) ABSTRACT

In switching of a microgrid from an isolated operation to an interconnected operation with a power grid, a CEMS server determines a first master DER and slaves based on a master plan and performs master-slave control. When the first master DER goes down, the CEMS server compares remaining capacities of power-storage-type DERs included in a DER group. The CEMS server then determines a DER with the highest remaining capacity as a second master DER among the power-storage-type DERs included in the DER group and performs master-slave control.

6 Claims, 7 Drawing Sheets

ELECTRIC POWER SYSTEM AND SERVER

This nonprovisional application is based on Japanese Patent Application No. 2020-213628 filed on Dec. 23, 2020 with the Japan Patent Office, the entire contents of which are hereby incorporated by reference.

BACKGROUND

Field

The present disclosure relates to an electric power system and a server.

Description of the Background Art

Japanese Patent Laying-Open No. 2020-028198 discloses a control system that manages supply and demand of a microgrid that is interconnected with an external power grid. This control system manages supply and demand of a microgrid using a plurality of power adjustment resources (e.g., a distributed power supply, a load, and an inductor with a flywheel) that can be electrically connected to the microgrid. When electric power supply from the external power grid to the microgrid is stopped, the load electrically connected to the microgrid is disconnected in accordance with a priority, and electric power is supplemented by the inductor with a flywheel.

SUMMARY

In an interconnected operation of the microgrid with the external power grid, the plurality of power adjustment resources are subjected to current control so as to be synchronized with the electric power of the external power grid, based on a frequency of the external power grid. Contrastingly, in an isolated operation of the microgrid, a frequency in the microgrid needs to be determined for controlling the plurality of power adjustment resources.

For example, it is conceivable that during the isolated operation of the microgrid, a power adjustment resource serving as a master that determines a frequency may be determined in advance, other power adjustment resources may be determined as slaves, and master-slave control may be performed. If the power adjustment resource serving as the master is stopped (goes down) for some reason, however, the isolated operation of the microgrid may not be performed appropriately.

The present disclosure has been made to solve the above problem. An object of the present disclosure is to appropriately perform an isolated operation of a power network.

An electric power system according to one aspect of the present disclosure includes a plurality of power adjustment resources electrically connected to a first power grid, and a management apparatus that manages electric power of the first power grid. The first power grid is configured to be connected to and disconnected from a second power grid. When the first power grid is connected to the second power grid and performs an interconnected operation with the second power grid, the management apparatus performs current control of the plurality of power adjustment resources to be synchronized with a frequency of the second power grid. When the first power grid is disconnected from the second power grid and performs an isolated operation, the management apparatus determines a prescribed power adjustment resource as a master, determines power adjustment resources other than the prescribed power adjustment resource as slaves, and performs master-slave control of the plurality of power adjustment resources, the prescribed power adjustment resource being a power adjustment resource determined in advance among the plurality of power adjustment resources. When the prescribed power adjustment resource fails to operate in the isolated operation of the first power grid, the management apparatus determines the master from among the plurality of power adjustment resources based on information about an amount of electric power of the plurality of power adjustment resources, determines, as slaves, power adjustment resources other than the master determined, and performs the master-slave control of the plurality of power adjustment resources.

With the above configuration, even when the prescribed power adjustment resource determined in advance as the master fails to operate in the isolated operation of the first power grid, the master can be selected from among the plurality of power adjustment resources, and master-slave control can be performed. Even when the prescribed power adjustment resource fails to operate in the isolated operation of the first power grid, thus, the isolated operation of the first power grid can be performed appropriately.

In one embodiment, information about an amount of electric power is information indicating a current power storage capacity. In the master-slave control, the management apparatus determines, as the master, a power adjustment resource with a highest power storage capacity among the plurality of power adjustment resources and determines, as slaves, power adjustment resources other than the master determined.

With the above configuration, since a power adjustment resource with a highest storage capacity among the plurality of power adjustment resources is determined as a master, master-slave control can be performed for a longer period of time than when a power adjustment resource lower in storage capacity is determined as a master.

In one embodiment, in the master-slave control, when a power storage capacity of the master falls below a threshold capacity, the management apparatus determines, as a new master, a slave with a highest power storage capacity among the slaves and determines, as a slave, a power adjustment resource that has served as the master.

With the above configuration, since a new master is selected when the storage capacity of the master falls below the threshold capacity, master-slave control can be continued even when the power storage capacity of the master decreases. In other words, the isolated operation of the first power grid can be continued appropriately without stopping the isolated operation of the first power grid.

In one embodiment, the information about an amount of electric power is information indicating a state of charge (SOC). In the master-slave control, the management apparatus determines, as the master, a power adjustment resource with a highest SOC among the plurality of power adjustment resources and determines, as slaves, power adjustment resources other than the master determined.

With the above configuration, since a power adjustment resource with a highest SOC among the plurality of adjustment resources is determined as the master, master-slave control can be performed for a longer period of time than when a power adjustment resource with a lower SOC is determined as the master.

In one embodiment, in the master-slave control, when an SOC of the master falls below a threshold SOC, the management apparatus determines, as a new master, a slave with a highest SOC among the slaves and determines, as a slave, a power adjustment resource that has served as the master.

With the above configuration, since a new master is determined when the SOC of the master falls below the threshold capacity, master-slave control can be continued even when the SOC of the master decreases. In other words, the isolated operation of the first power grid can be continued appropriately without stopping the isolated operation of the first power grid.

A server according to another aspect of the present disclosure manages electric power of a first power grid electrically connected with a plurality of power adjustment resources. The first power grid is configured to be connected to and disconnected from a second power grid. The server includes a storage that stores information about an amount of electric power of the plurality of power adjustment resources, and a controller. When the first power grid is connected to the second power grid and performs an interconnected operation with the second power grid, the controller performs current control of the plurality of power adjustment resources to be synchronized with a frequency of the second power grid. When the first power grid is disconnected from the second power grid and performs an isolated operation, the controller determines a prescribed power adjustment resource as a master, determines power adjustment resources other than the prescribed power adjustment resource as slaves, and performs master-slave control of the plurality of power adjustment resources, the prescribed power adjustment resource being a power adjustment resource determined in advance among the plurality of power adjustment resources. When the prescribed power adjustment resource fails to operate in the isolated operation of the first power grid, the controller determines the master from among the plurality of power adjustment resources based on the information about an amount of electric power, determines, as slaves, power adjustment resources other than the master determined, and performs the master-slave control of the plurality of power adjustment resources.

The foregoing and other objects, features, aspects and advantages of the present disclosure will become more apparent from the following detailed description of the present disclosure when taken in conjunction with the accompanying drawings.

DESCRIPTION OF THE PREFERRED EMBODIMENTS

Figure 1:
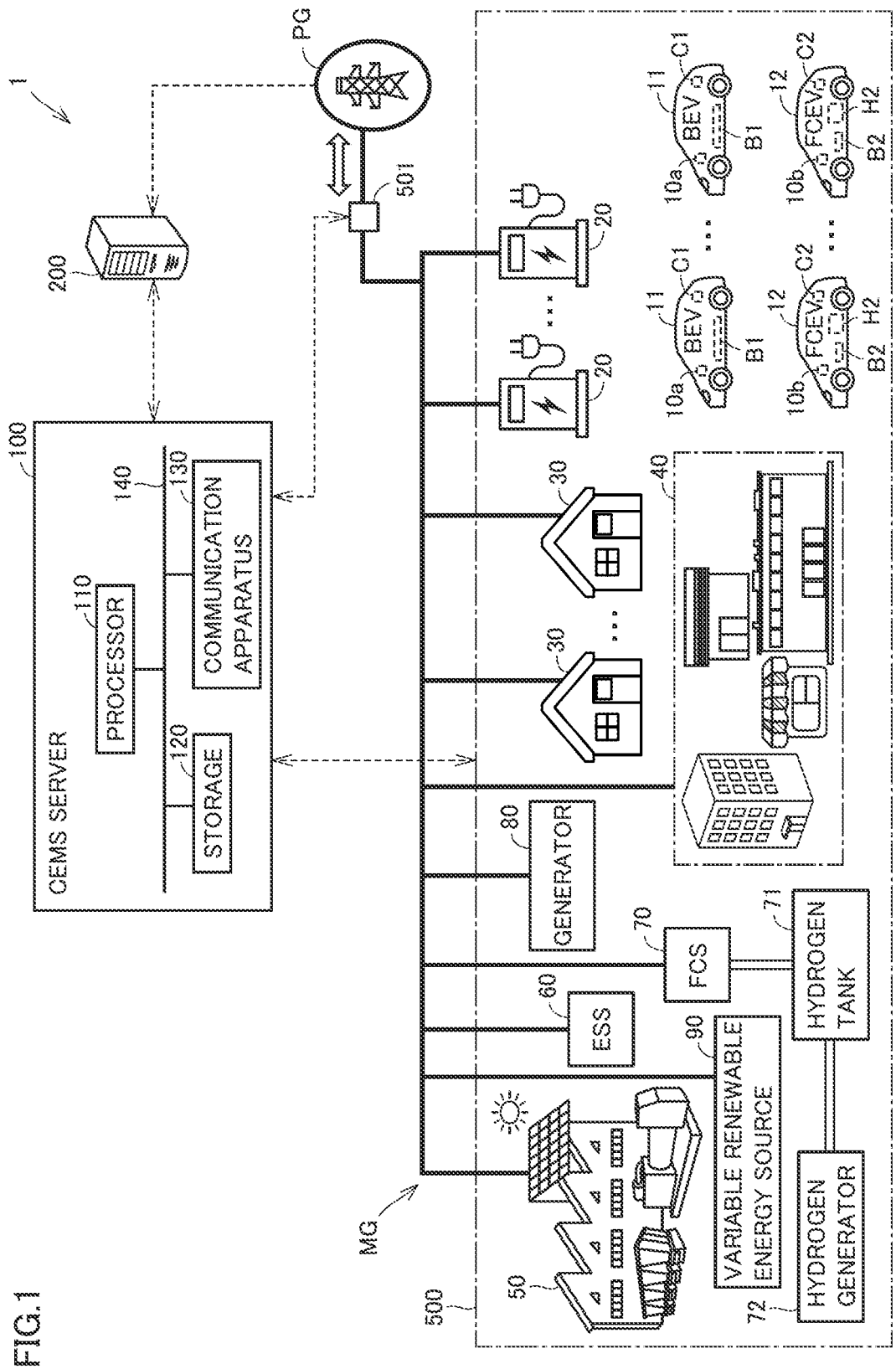
FIG. 1 shows a schematic configuration of an electric power system according to an embodiment.

An embodiment of the present disclosure will be described below in detail with reference to the drawings.
The same or corresponding elements in the drawings have the same reference characters allotted and description thereof will not be repeated.

[Embodiments]
<Overall Configuration of Electric Power System>

FIG. 1 shows a schematic configuration of an electric power system according to an embodiment. An electric power system 1 includes a power grid PG, a microgrid MG, a community energy management system (CEMS) server 100, a power transmission and distribution utility server 200, a distributed energy resource (DER) group 500, and a power reception and transformation facility 501.

Microgrid MG is a power network that supplies electric power to one city (e.g., a smart city) as a whole. Supply and demand of electric power in microgrid MG is managed by CEMS server 100. A power line for networking of a plurality of DERs in microgrid MG may be a private power line. Microgrid MG is configured to be connected to and disconnected from power grid PG.

Power transmission and distribution utility server 200 is a computer that manages supply and demand of power grid PG. Power grid PG is a power network constructed by a power plant (not shown) and a power transmission and distribution facility. In the present embodiment, a power company serves as a power generation utility and a power transmission and distribution utility. The power company corresponds to a general power transmission and distribution utility, and maintains and manages power grid PG (commercial power grid). The power company corresponds to a manager of power grid PG. Power transmission and distribution utility server 200 belongs to the power company.

Power reception and transformation facility 501 is provided at a point of interconnection (power reception point) of microgrid MG and is configured to switch between connection (parallel in) and disconnection (parallel off) between power grid PG and microgrid MG. Power reception and transformation facility 501 is located at a point of connection between microgrid MG and power grid PG.

When microgrid MG is performing an interconnected operation while being connected to power grid PG, power reception and transformation facility 501 receives alternating-current (AC) power from power grid PG, down-converts the received power, and supplies the down-converted power to microgrid MG. When microgrid MG is performing an isolated operation while being disconnected from power grid PG, electric power is not supplied from power grid PG to microgrid MG. Power reception and transformation facility 501 includes a high-voltage-side (primary-side) switch (e.g., a section switch, an isolator, a breaker, and a load switch), a transformer, a protection relay, a measurement instrument, and a controller. CEMS server 100 is configured to receive information (e.g., a power waveform) on microgrid MG from power reception and transformation facility 501 and indicate connection and disconnection to power reception and transformation facility 501.

CEMS server 100 is configured to communicate with each of power transmission and distribution utility server 200 and DER group 500. A communications protocol may be OpenADR. DER group 500 includes a plurality of DERs that can be electrically connected to microgrid MG. CEMS server 100 is configured to manage the plurality of DERs included in DER group 500. CEMS server 100 may perform demand response (DR) to DER group 500 when it is requested to adjust supply and demand of power grid PG from power transmission and distribution utility server 200. CEMS server 100 may perform DR to DER group 500 in response to a request from a supply and demand adjustment market. CEMS server 100 may perform DR to DER group 500 in order to adjust supply and demand of microgrid MG.

DER group 500 includes electric vehicle supply equipment (EVSE) 20, a house 30, a commercial facility 40, a factory 50, an energy storage system (ESS) 60, a fuel cell system (FCS) 70, a generator 80, and a variable renewable energy source 90. Each of these may function as a DER. The plurality of DERs included in DER group 500 are electrically connected to one another via microgrid MG.

DER group 500 further includes a battery electric vehicle (BEV) 11 and a fuel cell electric vehicle (FCEV) 12. EVSE 20 functions as a DER as electrically connected to a vehicle (e.g., BEV or FCEV). For example, as a charging connector of EVSE 20 is inserted (plugged) into an inlet of the vehicle, EVSE 20 and the vehicle are electrically connected to each other.

Any number of vehicles may be included in DER group 500. DER group 500 may include a personally owned vehicle (POV) or a mobility as a service (MaaS) vehicle. The MaaS vehicle is a vehicle managed by a MaaS entity. Any number of pieces of EVSE 20, houses 30, commercial facilities 40, factories 50, ESSs 60, FCSs 70, generators 80, and variable renewable energy sources 90 may be included in DER group 500. Each DER included in DER group 500 corresponds to an example of "power adjustment resource" according to the present disclosure.

BEV 11 includes an electronic control unit (ECU) 10a, a battery B1, and a communication apparatus C1. ECU 10a is configured to control each piece of equipment mounted on BEV 11. Communication apparatus C1 is configured to communicate wirelessly with CEMS server 100. Battery B1 includes, for example, a secondary battery such as a nickel metal hydride battery or a lithium ion battery. Electric power stored in battery B1 is used for driving a motor (not shown) for travel of BEV 11 or for driving each piece of equipment mounted on BEV 11.

FCEV 12 includes an ECU 10b, a generator H2, a battery B2, and a communication apparatus C2. Generator H2 includes a hydrogen tank (not shown) in which hydrogen is stored and a fuel cell (not shown) that generates electric power by chemical reaction between hydrogen and oxygen. The fuel cell generates electric power by using hydrogen supplied from the hydrogen tank. Electric power generated by generator H2 is used for driving a motor (not shown) for travel of FCEV 12, used for driving each piece of equipment mounted on FCEV 12, or stored in battery B2. A user of FCEV 12 can add hydrogen at a hydrogen station (not shown) provided in the city. Communication apparatus C2 is configured to communicate wirelessly with CEMS server 100. Battery B2 includes, for example, a secondary battery such as a nickel metal hydride battery or a lithium ion battery. Electric power stored in battery B2 is used for driving a motor (not shown) for travel of FCEV 12 or for driving each piece of equipment mounted on FCEV 12.

EVSE 20 is, for example, a charging facility provided in the city. EVSE 20 is public EVSE that can be used by a user of a vehicle after prescribed authentication. An authentication method may be authentication by a charging card or authentication by communication (e.g., Plug and Charge). In the present embodiment, DER group 500 includes a plurality of pieces of EVSE 20.

House 30 includes various home electrical appliances (e.g., a lighting device, an air-conditioning facility, kitchen equipment, information equipment, a television, a refrigerator, and a washing machine). House 30 may also include at least one of a charger-discharger (e.g., home EVSE), a variable renewable energy source (e.g., a photovoltaic panel provided on a roof), an ESS, an FCS, and a cogeneration system (e.g., a water heater or a heat pump water heater that uses heat generated in self-generation). Supply and demand of energy in house 30 is managed, for example, by a home energy management system (HEMS), which is not shown. Microgrid MG and house 30 are connected to each other to supply and receive electric power therebetween. In the present embodiment, CEMS server 100 and each house 30 communicate with each other through the HEMS. In the present embodiment, DER group 500 includes a plurality of houses 30.

Commercial facility 40 includes, for example, office buildings and stores. Examples of the stores include department stores, shopping centers, supermarkets, or convenience stores. Supply and demand of energy in each facility included in commercial facility 40 is managed, for example, by a building energy management system (BEMS), which is not shown. The BEMS may manage supply and demand of energy individually for each facility or may collectively manage supply and demand of energy in a plurality of facilities. Each facility included in commercial facility 40 and microgrid MG are connected to each other to supply and receive electric power therebetween. In the present embodiment, CEMS server 100 communicates with commercial facility 40 through the BEMS.

Factory 50 may be, for example, a car factory or another factory. Factory 50 includes, for example, a production line and a concentrated heat source for air-conditioning. Factory 50 may also include at least one of a variable renewable energy source (e.g., a photovoltaic power generation facility or a wind power generation facility), EVSE, an ESS, an FCS, a generator (e.g., a gas turbine generator or a diesel generator), and a cogeneration system. Supply and demand of energy in factory 50 is managed, for example, by a factory energy management system (FEMS), which is not shown. Microgrid MG and factory 50 are connected to each other to supply and receive electric power therebetween. In the present embodiment, CEMS server 100 and factory 50 communicate with each other through the FEMS.

ESS 60 includes a stationary battery configured to be chargeable from and dischargeable to microgrid MG. For example, the battery included in ESS 60 may be a lithium ion battery, a lead-acid battery, a nickel metal hydride battery, a redox flow battery, or a sodium-sulfur (NAS) battery. Surplus electric power generated by variable renewable energy source 90 may be stored in ESS 60.

FCS 70 includes a stationary fuel cell that generates electric power by chemical reaction between hydrogen and oxygen. FCS 70 is connected to a hydrogen tank 71. Hydrogen tank 71 is connected to a hydrogen generator 72. FCS 70 is configured to generate electric power by using hydrogen supplied from hydrogen tank 71 and supply generated electric power to microgrid MG. Hydrogen generator 72 can adopt any method. For example, a known method such as a by-product hydrogen method, water electrolysis, a fossil fuel reforming method, a biomass reforming method, or an iodine-sulfur (IS) process may be adopted for hydrogen generator 72. Hydrogen generator 72 may generate hydrogen by using electric power supplied from microgrid MG or using surplus electric power generated by variable renewable energy source 90. CEMS server 100 may control hydrogen generator 72 such that a remaining amount of hydrogen in hydrogen tank 71 does not fall below a prescribed value.

Generator 80 is a stationary generator that generates electric power by using fossil fuel. Generator 80 may be, for example, a gas turbine generator or a diesel generator. Generator 80 may be used as an emergency power supply.

Variable renewable energy source 90 is a power supply that varies in generated power output depending on a weather condition and provides generated electric power to microgrid MG. Variable renewable energy source 90 includes, for example, a photovoltaic power generation facility and a wind power generation facility. Electric power generated by variable renewable energy source 90 corresponds to variable renewable energy (VRE).

CEMS server 100 includes a processor 110, a storage 120, and a communication apparatus 130. Processor 110, storage 120, and communication apparatus 130 are connected to one another by a bus 140. Processor 110 may be a central processing unit (CPU). Storage 120 is configured to store various types of information. Storage 120 stores a program executed by processor 110, as well as information (e.g., a map, a mathematical expression, and various parameters) to be used by a program. Communication apparatus 130 includes various communication interfaces (I/Fs) CEMS Server 100 is configured to communicate with the outside through communication apparatus 130.

CEMS server 100 controls DER group 500 connected to microgrid MG to function as a virtual power plant (VPP). More specifically, CEMS server 100 remotely controls DER group 500 as being integrated as if the DERs functioned as a single power plant according to an energy management technology that makes use of the Internet of Things (IoT).

In the present embodiment, the manager of microgrid MG has an electricity contract with a power company. The power company supplies electric power to microgrid MG in accordance with the electricity contract. Under this electricity contract, electric power supplied to microgrid MG from power grid PG is determined. This electric power will also be referred to as "contract power" below. "Supplied power satisfies contract power" means that supplied power is neither too much nor too less for contract power (is included in the range determined as contract power).

CEMS server 100 is configured to adjust electric power supply and demand of microgrid MG such that electric power supplied from power grid PG to microgrid MG satisfies contract power, when microgrid MG performs the interconnected operation with power grid PG while being connected to power grid PG. During the interconnected operation of microgrid MG, CEMS server 100 controls a DER that functions as adjustment power for microgrid MG, thereby adjusting electric power supply and demand. A DER that functions as the power for adjustment of microgrid MG will also be referred to as "adjustment power DER" below.

CEMS server 100 is configured to adjust electric power supply and demand of microgrid MG without receiving electric power supply from power grid PG, when electric power supply from power grid PG is stopped and microgrid MG performs the isolated operation. During the isolated operation of microgrid MG, CEMS server 100 controls the adjustment power DER to adjust electric power supply and demand.

Control of the adjustment power DER during the interconnected operation and during the isolated operation of microgrid MG will be described below specifically with reference to FIGS. 1 and 2.

Figure 2:
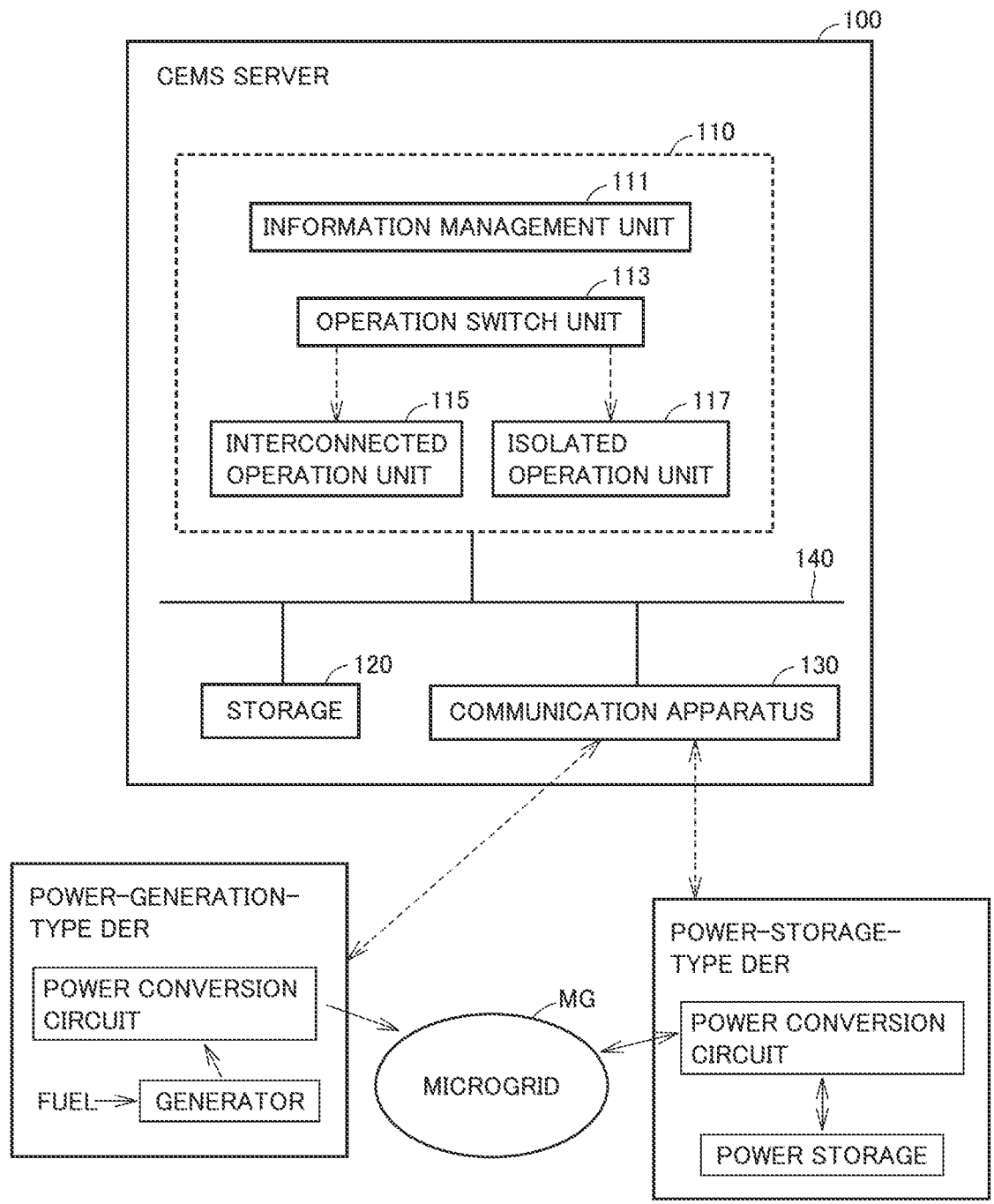
FIG. 2 is a functional block diagram showing components of a CEMS server by function.

FIG. 2 is a functional block diagram showing components of CEMS server 100 by function. Referring to FIG. 2 as well as FIG. 1, processor 110 of CEMS server 100 includes an information management unit 111, an operation switch unit 113, an interconnected operation unit 115, and an isolated operation unit 117. For example, processor 110 functions as information management unit 111, operation switch unit 113, interconnected operation unit 115, and isolated operation unit 117 by executing the program stored in storage 120. Information management unit 111, operation switch unit 113, interconnected operation unit 115, and isolated operation unit 117 may be implemented, for example, by dedicated hardware (electronic circuit).

Information management unit 111 manages information on DER (hereinafter also referred to as "resource information") registered with CEMS server 100. Identification information (ID) is assigned individually to each DER included in DER group 500 and is stored in storage 120. Information management unit 111 collects information on each DER, updates resource information for each prescribed control cycle, and causes storage 120 to store the updated resource information.

EVSE 20, house 30, commercial facility 40, factory 50, ESS 60, FCS 70, generator 80, and variable renewable energy source 90 are registered with CEMS server 100 as stationary DERs. Further, vehicles (BEV 11, FCEV 12) are registered with CEMS server 100 as mobile DERs. The vehicle is connected to EVSE 20 to function as a DER.

Resource information includes information about an amount of electric power of each DER. The information about an amount of electric power includes information indicating electric power consumed by each of house 30, commercial facility 40, and factory 50. The information about an amount of electric power includes information indicating an SOC of a battery of ESS 60, information indicating charging and discharging power, and information indicating a remaining capacity (kWh). The information about an amount of electric power also includes information indicating electric power generated by FCS 70 and information indicating a remaining amount of hydrogen in hydrogen tank 71. The information about an amount of electric power also includes information indicating electric power generated by each of generator 80 and variable renewable energy source 90.

The information about an amount of electric power further includes information indicating an SOC of battery B1 of BEV 11 connected to EVSE 20, information indicating charging and discharging power of battery B1, and information indicating a remaining capacity (kWh) of battery B1. The information about an amount of electric power further includes information indicating a remaining amount of hydrogen in generator H2 of FCEV 12 connected to EVSE 20, information indicating an amount of electric power generated in generator H2, information indicating an SOC of battery B2, and information indicating charging and discharging power of battery B2.

The resource information may include information indicating an operating state of each DER (whether it is operating or stopped). CEMS server 100 can communicate with each stationary DER to obtain the resource information.

The DERs included in DER group 500 are categorized into a power-generation-type DER, a power-storage-type DER, and a load-type DER.

In the power-generation-type DER, the generator generates electric power with prescribed fuel (e.g., light oil, natural gas, or hydrogen), and generated electric power is provided to microgrid MG through a power conversion circuit. In the power-storage-type DER, electric power is exchanged between the battery and microgrid MG through the power conversion circuit. The power conversion circuit in each DER is configured to operate in accordance with a control signal from CEMS server 100 and perform prescribed power conversion. In the present embodiment, the power conversion circuit includes an inverter and a phase locked loop (PLL). The power conversion circuit may include a relay that switches between connection and disconnection between a DER and microgrid MG.

For example, in DER group 500 shown in FIG. 1, ESS 60 functions as the power-storage-type DER. Each of FCS 70, generator 80, and variable renewable energy source 90 functions as the power-generation-type DER. Although electric power generated by variable renewable energy source 90 basically depends on a weather condition, power generation output of variable renewable energy source 90 can be restricted.

BEV 11 functions as the power-storage-type DER by performing charging and discharging of power storage B1 connected to microgrid MG. FCEV 12 functions as the power-generation-type DER by providing electric power generated by generator H2 to microgrid MG. FCEV 12 may be configured to function as the power-storage-type DER. When the capacity and charging and discharging performance of power storage B2 are sufficient, FCEV 12 can function also as the power-storage-type DER. The power conversion circuit may be mounted on a vehicle (BEV 11 or FCEV 12) or on EVSE 20. For example, direct-current (DC) power may be provided from the vehicle to EVSE 20 of DC type and the inverter contained in EVSE 20 may perform DC/AC conversion. The vehicle-mounted inverter may perform DC/AC conversion on electric power discharged from the battery included in the vehicle, and resultant AC power may be provided from the vehicle to the EVSE of AC type.

Though not shown in FIG. 2, an electrical appliance that consumes electric power of microgrid MG can also function as the DER. As electrical load of the electrical appliance connected to microgrid MG is higher, an amount of power consumption in microgrid MG is larger. For example, a demand side of each of house 30, commercial facility 40, and factory 50 shown in FIG. 1 can adjust supply and demand of microgrid MG by adjusting the electrical load of the electrical appliance.

Information management unit 111 collects information on each DER, updates resource information for each prescribed control cycle, and causes storage 120 to store the updated resource information.

Operation switch unit 113 determines switching between the interconnected operation and the isolated operation of microgrid MG, and provides a notification to interconnected operation unit 115 and isolated operation unit 117. During the interconnected operation of microgrid MG, operation switch unit 113 monitors whether a fault has occurred in power grid PG. Such monitoring is performed repeatedly, for example, for each prescribed control cycle. The fault means that, for example, electric power cannot be supplied from power grid PG to microgrid MG due to a power failure, a break, or the like. When no fault has occurred in power grid PG, operation switch unit 113 provides a first notification to interconnected operation unit 115. The first notification is a notification that indicates the interconnected operation. Upon receipt of the first notification, interconnected operation unit 115 continues current control, which will be described below. When a fault has occurred in power grid PG, operation switch unit 113 provides a second notification to isolated operation unit 117. The second notification is a notification that indicates the isolated operation. Upon receipt of the second notification, isolated operation unit 117 starts master-slave control, which will be described below.

During the isolated operation of microgrid MG, operation switch unit 113 monitors recovery of power grid PG in which the fault has occurred. Such monitoring is performed repeatedly, for example, for each prescribed control cycle. When power grid PG has not been recovered, operation switch unit 113 provides the second notification to isolated operation unit 117. Upon receipt of the second notification, isolated operation unit 117 continues master-slave control described below. When power grid PG has been recovered, operation switch unit 113 provides the first notification to interconnected operation unit 115. Upon receipt of the first notification, interconnected operation unit 115 starts current control, which will be described below.

During the interconnected operation of microgrid MG, interconnected operation unit 115 adjusts supply and demand of microgrid MG and power grid PG by performing current control of the adjustment power DER. The adjustment power DER contains, for example, a power conversion circuit including an inverter and a PLL. Interconnected operation unit 115 detects an amplitude and a phase of a voltage waveform of power grid PG using the PLL of the adjustment power DER, and controls the inverter of the adjustment power DER such that the electric power of microgrid MG is synchronized with the electric power of power grid PG. Interconnected operation unit 115 controls an AC current by the inverter of the adjustment power DER and causes a current flowing through microgrid MG to follow a target current value while providing feedback of a current detection value. More specifically, interconnected operation unit 115 divides the current flowing through microgrid MG into an active current component and a reactive current component, and controls the voltage output from the inverter of the adjustment power DER such that each of the active current component and the reactive current component attains to the target current value. Current control of the adjustment power DER may be performed in interconnection with the FMES, HEMS, BEMS, ECU, or the like.

During the isolated operation of microgrid MG, isolated operation unit 117 adjusts supply and demand of microgrid MG by performing master-slave control of the adjustment power DER. A DER that serves as a master in master-slave control is determined and stored in storage 120 in advance. Information indicating a DER that serves as the master will also be referred to as "master plan" below. For example, a stationary DER such as ESS 60, FCS 70, or generator 80 is selected as the DER determined as the master. Upon receipt of the second notification (the notification that indicates the isolated operation) from operation switch unit 113, isolated operation unit 117 reads the master plan from storage 120, and determines the DER specified in the master plan as a master and other DERs as slaves.

In master-slave control by isolated operation unit 117, the master electrically connected to microgrid MG performs voltage control by the power conversion circuit (including the inverter), and each slave electrically connected to microgrid MG performs current control by the power conversion circuit (including the inverter). The master is operated through voltage control. Voltage control may be constant voltage constant frequency (CVCF) control. As isolated operation unit 117 controls the master such that constant-voltage and constant-frequency AC power is provided from the master, the frequency and voltage of microgrid MG can be determined. Each slave is operated through current control in accordance with the frequency and voltage determined by the master. The DER determined as the master in the master plan will also be referred to as "first master DER" below.

Isolated operation unit 117 outputs an adjustment command to each DER. The adjustment command transmitted to the DER (first master DER) that is to serve as the master includes, for example, information indicating that the DER (first master DER) is to serve as the master and information indicating a target frequency and a target voltage value. The adjustment command transmitted to the DER that is to serve as the slave includes, for example, information indicating that the DER is to serve as the slave. The adjustment command transmitted to the DER that is to serve as the slave may include information indicating a target frequency and a target voltage value.

The first master DER may stop (go down) for some reason. For example, the first master DER may go down due to a disaster. In such a case, a frequency in microgrid MG may not be determined, and the isolated operation may not be performed appropriately.

In the present embodiment, thus, when the first master DER goes down, isolated operation unit 117 determines a new master and performs (continues) master-slave control. In the present embodiment, isolated operation unit 117 selects a master from among power-storage-type DERs based on the information about an amount of electric power included in the resource information. More specifically, isolated operation unit 117 selects a DER with the highest remaining capacity as a master from among power-storage-type DERs included in DER group 500.

In BEV 11, the remaining capacity is a value of the remaining capacity of battery B1. In ESS 60, the remaining capacity is a value of the remaining capacity of the battery. FCEV 12 can also be included in candidates of the master as the power-storage-type DER. In FCEV 12, the remaining capacity is a value of the remaining capacity of battery B2. In FCEV 12, the remaining capacity of battery B2, as well as an amount of electric power supplied from generator H2 to battery B2, may be reflected on the remaining capacity.

Isolated operation unit 117 compares the remaining capacities of power-storage-type DERs, and selects a DER with the highest remaining capacity as a master. When selecting the master, isolated operation unit 117 performs voltage control of the DER selected as the master, determines DERs other than the master as slaves, and performs current control. The DER selected as the master through the comparison of the remaining capacity will also be referred to as "second master DER" below. Also when the first master DER (the DER determined in the master plan) goes down, thus, the second master DER is determined as the master in place of the first master DER and master-slave control is performed, so that the isolated operation of microgrid MG can be performed (continued) appropriately. As a DER with the highest remaining capacity is selected as the second master DER from among power-storage-type DERs included in DER group 500, master-slave control with the selected DER as a master can be performed for a longer period of time than when a DER lower in capacity is selected as a master.

In master-slave control, isolated operation unit 117 can use a value obtained by dividing the overall target current value by the number of slaves as the target current value for each slave. In other words, the target current value for each slave is set to the same value. Alternatively, the target current value in current control of slaves may be set in accordance with the remaining capacity of each slave. For example, the target current value of a slave higher in remaining capacity may be set to be greater than the target current value of a slave lower in remaining capacity. Alternatively, the target current value in current control of slaves may be set in accordance with the SOC of each slave. For example, the target current value of a slave higher in SOC may be set to be greater than the target current value of a slave lower in SOC.

In the present embodiment, further, when the remaining capacity of the second master DER decreases during the isolated operation of microgrid MG, isolated operation unit 117 changes the second master DER. Second master DER, which is a power-storage-type DER, may fail to continue an operation if its capacity decreases to a prescribed value. For this reason, isolated operation unit 117 monitors the remaining capacity of the second master DER during the isolated operation, and when the remaining capacity of the second master DER falls below a threshold capacity, changes the second master DER to another DER. The threshold capacity is a threshold for determining whether the DER selected as the second master DER can continue an operation. Specifically, when the remaining capacity of the second master DER falls below the threshold capacity, isolated operation unit 117 selects, as the second master DER, a power-storage-type DER with the highest remaining power among the slaves. At this time, isolated operation unit 117 changes the DER that has been selected as the second master DER (the DER, the remaining capacity of which has fallen below the threshold capacity) to a slave. Even when the remaining capacity of the second master DER decreases, thus, the isolated operation of microgrid MG can be continued appropriately.

The amount of electric power required for continuing an operation varies depending on DERs. The threshold capacity may be set, for example, for each DER based on the amount of electric power required for continuing an operation.

<Process Performed by CEMS Server>
<<Process during Interconnected Operation>>

Figure 3:
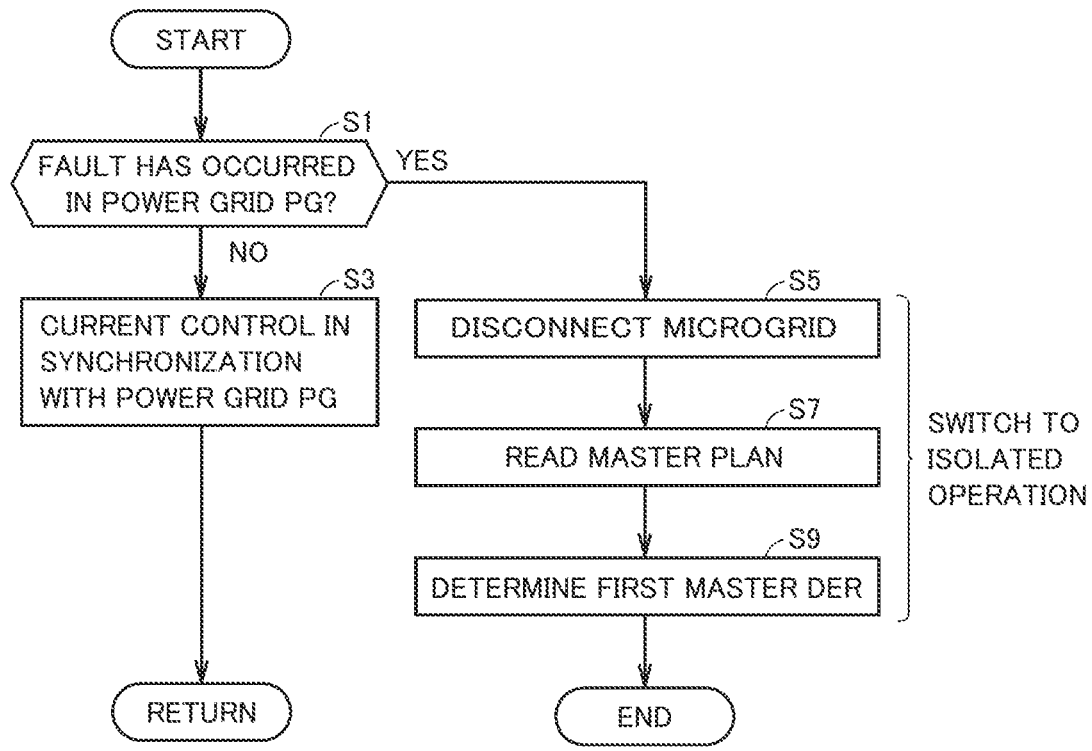
FIG. 3 is a flowchart showing a procedure of a process performed by the CEMS server during an interconnected operation of a microgrid.

FIG. 3 is a flowchart showing a procedure of a process performed by CEMS server 100 during the interconnected operation of microgrid MG. The process of the flowchart shown in FIG. 3 is repeatedly performed for each prescribed control cycle by CEMS server 100 during the interconnected operation of microgrid MG. Although each step (a step will be abbreviated as "S" below) of the flowcharts shown in FIG. 3 and FIGS. 4 to 7, which will be described below, will be described for the case in which each step is implemented through software processing by CEMS server 100, some or all of steps may be implemented by hardware (electronic circuit) fabricated in CEMS server 100.

At S1, CEMS server 100 determines, for example, whether a fault such as a power failure has occurred in power grid PG (external grid), that is, whether electric power supply from power grid PG has been stopped inadvertently. When no fault has occurred in power grid PG (in a normal case) (NO at S1), CEMS server 100 moves the process to S3 in order to continue the interconnected operation. When a fault has occurred in power grid PG (YES at S1), CEMS server 100 moves the process to S5 in order to switch from the interconnected operation to the isolated operation.

At S3, CEMS server 100 operates the adjustment power DER through current control such that the electric power of microgrid MG is synchronized with the electric power of power grid PG. CEMS server 100 adjusts a current of microgrid MG (and accordingly, a supply and demand balance of microgrid MG) by the adjustment power DER. When performing processing of S3, CEMS server 100 moves the process to RETURN.

Since a fault has occurred in power grid PG, CEMS server 100 performs processing of switching from the interconnected operation to the isolated operation in S5 to S9.

At S5, CEMS server 100 controls the breaker of power reception and transformation facility 501 to disconnect microgrid MG. As a result, microgrid MG is isolated from power grid PG.

At S7, CEMS server 100 reads the master plan from storage 120 in order to switch from the interconnected operation to the isolated operation.

At S9, CEMS server 100 determines a DER (first master DER) that is to serve as a master, in accordance with the master plan read at S7. CEMS server 100 determines DERs other than the first master DER as slaves. CEMS server 100 then switches control of DER group 500 from current control for synchronization with power grid PG to master-slave control. When processing of S9 is performed, a series of processing shown in FIG. 3 ends, and a process shown in FIG. 4 described below is started.

<<Process During Isolated Operation>>

Figure 4:
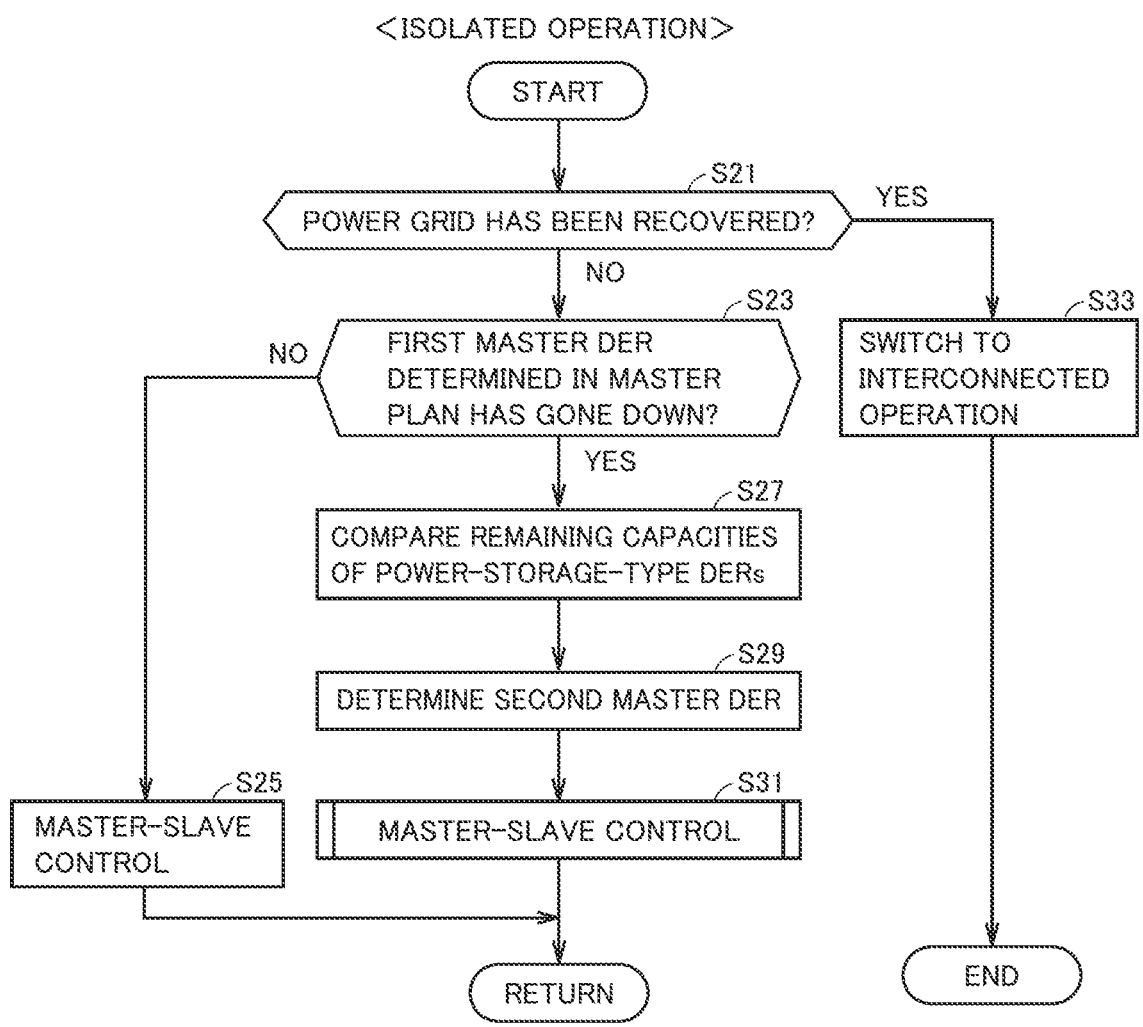
FIG. 4 is a flowchart showing a procedure of a process performed by the CEMS server during an isolated operation of the microgrid.

FIG. 4 is a flowchart showing a procedure of a process performed by CEMS server 100 during the isolated operation of microgrid MG. The process of the flowchart shown in FIG. 4 is repeatedly performed for each prescribed control cycle by CEMS server 100 during the isolated operation of microgrid MG.

At S21, CEMS server 100 determines whether power grid PG (external grid) in which the fault had occurred has been recovered. When power grid PG has not been recovered (NO at S21), CEMS server 100 moves the process to S23. When power grid PG has been recovered (YES at S21), CEMS server 100 moves the process to S33.

At S23, CEMS server 100 determines whether the first master DER has gone down. When the first master DER has not gone down (NO at S23), CEMS server 100 moves the process to S25. When the first master DER has gone down (YES at S23), CEMS server 100 moves the process to S27.

At S25, CEMS server 100 continues master-slave control with the first master DER as a master. CEMS server 100 sends an adjustment command to each of the master and the slaves, thereby controlling the master and the slaves to stabilize the electric power of microgrid MG. The master is operated, for example, through CVCF control. Each slave is operated through current control in accordance with the frequency and voltage determined by the master. When performing processing of S25, CEMS server 100 moves the process to RETURN.

At S27, CEMS server 100 compares the remaining capacities of power-storage-type DERs set as slaves in order to select a master that is to replace the first master DER. CEMS server 100 can obtain a remaining capacity of each power-storage-type DER with reference to the resource information in storage 120 (FIG. 2).

At S29, CEMS server 100 selects, as a master, a DER, with the highest remaining capacity among power-storage-type DERs set as slaves, and determines this DER as a second master DER. CEMS server 100 determines DERs other than the second master DER as slaves.

At S31, CEMS server 100 performs master-slave control with the second master DER as a master. Processing of S31 will be described in detail with reference to FIG. 5. Processing of S27 and processing of S29 are performed once or not performed every time a switch is made from the interconnected operation to the isolated operation. In other words, during a continuous isolated operation, processing of S27 and processing of S29 for the second and subsequent times will be skipped.

Figure 5:
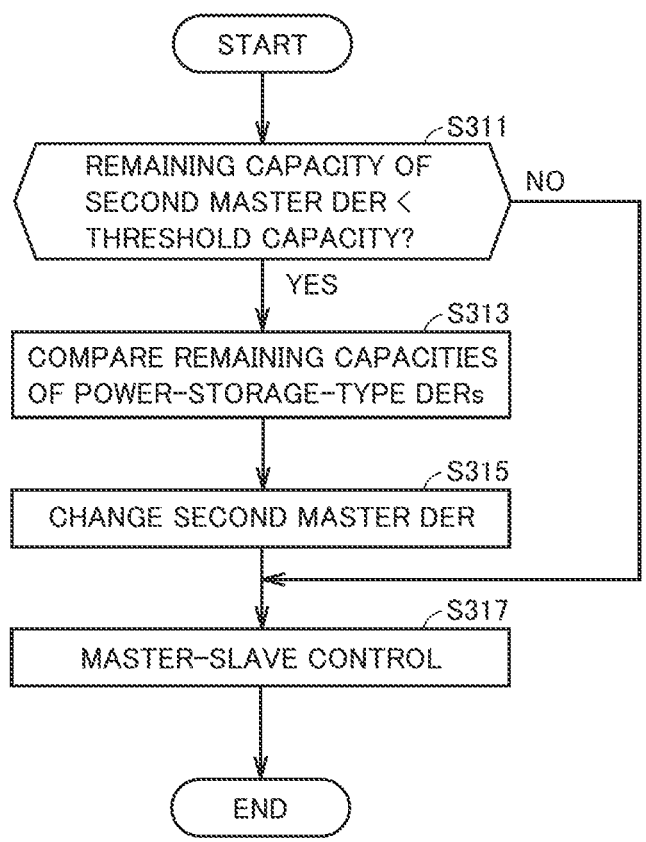
FIG. 5 is a flowchart showing detailed processing of S31 of FIG. 4.

FIG. 5 is a flowchart showing detailed processing of S31 of FIG. 4.

At S311, CEMS server 100 determines whether the remaining capacity of the second master DER has fallen below the threshold capacity. When determining that the remaining capacity of the second master DER has fallen below the threshold capacity (YES at S311), CEMS server 100 moves the process to S313. When determining that the remaining capacity of the second master DER has not fallen below the threshold capacity (NO at S311), CEMS server 100 moves the process to S317.

At S313, CEMS server 100 compares the remaining capacities of power-storage-type DERs set as slaves. CEMS server 100 can obtain the remaining capacity of each power-storage-type DER with reference to the resource information in storage 120 (FIG. 2).

At S315, CEMS server 100 selects, as a master, a DER with the highest capacity among the power-storage-type DERs set as slaves, and determines this DER as the second master DER in place of the DER currently set as the second master DER. CEMS server 100 determines DREs other than the second master DER as slaves. CEMS server 100 also determines the DER that has been set as the second master DER as a slave.

At S317, CEMS server 100 performs master-slave control. CEMS server 100 sends an adjustment command to each of the master and the slaves, thereby controlling the master and the slaves to stabilize the electric power of microgrid MG. The master is operated, for example, through CVCF control. Each slave is operated through current control in accordance with the frequency and voltage determined by the master. When processing of S317 is performed, the process returns to S31 of FIG. 4, and the process proceeds to RETURN.

Referring again to FIG. 4, at S33, CEMS server 100 switches microgrid MG from the isolated operation to the interconnected operation. More specifically, CEMS server 100 closes the breaker (interconnected breaker) of power reception and transformation facility 501 to connect microgrid MG to power grid PG. CEMS server 100 also switches a power control mode of microgrid MG from master-slave control to current control for synchronization with power grid PG. When processing of S33 is performed, a series of processing shown in FIG. 4 ends. Then, as microgrid MG starts the interconnected operation, the process of FIG. 3 described above is started.

In the present embodiment, when the master (first master DER) determined in the master plan goes down in the isolated operation of microgrid MG, CEMS server 100 selects a master (selects the second master DER) from among power-storage-type DERs included in DER group 500 and performs master-slave control, as described above. Even when the first master DER goes down, thus, a master can be set newly and master-slave control can be performed or continued. In other words, even when the first master DER goes down, also, the isolated operation of microgrid MG can be performed or continued appropriately.

A DER with the highest remaining capacity among the power-storage-type DERs included in DER group 500 is selected as the second master DER. As the DER with the highest remaining capacity is selected as the second master DER, master-slave control with the selected DER as the master can be performed for a longer period of time than when a DER lower in remaining capacity is selected as the second master DER.

In master-slave control, when the remaining capacity of the second master DER falls below the threshold capacity, CEMS server 100 selects a DER with the highest remaining capacity as a new second master DER from among the power-storage-type DERs included in DER group 500. The isolated operation of microgrid MG can thus be continued appropriately without stopping the isolated operation of microgrid MG.

[Modification 1]

In the embodiment, the remaining capacity of the power-storage-type DER is used in selectin of a second master DER in master-slave control. Alternatively, any other parameter may be used in selection of a second master DER. For example, a second master DER in master-slave control may be selected based on an SOC of a power-storage-type DER.

During the isolated operation of microgrid MG, when the first master DER goes down, CEMS server 100 selects a second master DER that is to replace the first master DER. At this time, CEMS server 100 selects a DER with the highest SOC among power-storage-type DERs as a master and determines this DER as the second master DER. CEMS server 100 determines other DERs of DER group 500 as slaves. CEMS server 100 then performs master-slave control.

During master-slave control, CEMS server 100 monitors the SOC of the second master DER. When the SOC of the second master DER decreases to a threshold SOC, CEMS server 100 changes the second master DER to any other DER. The threshold SOC is a threshold for determining whether the DER selected as the second master DER can continue an operation. Specifically, isolated operation unit 117 of CEMS server 100 selects, as the second master DER, a power-storage-type DER with the highest SOC among the slaves when the SOC of second master DER falls below the threshold SOC. At this time, isolated operation unit 117 changes the DER that has been selected as the second master DER (the DER, the SOC of which has fallen below threshold SOC) to a slave. Even when the SOC of the second master DER decreases, thus, the isolated operation of microgrid MG can be continued appropriately. Even when the SOC of the second master DER decreases, thus, the isolated operation of microgrid MG can be continued appropriately.

The amount of electric power required for continuing an operation can vary depending on DERs. The threshold SOC may be set for each DER based on the amount of electric power required for continuing an operation.

Figure 6:
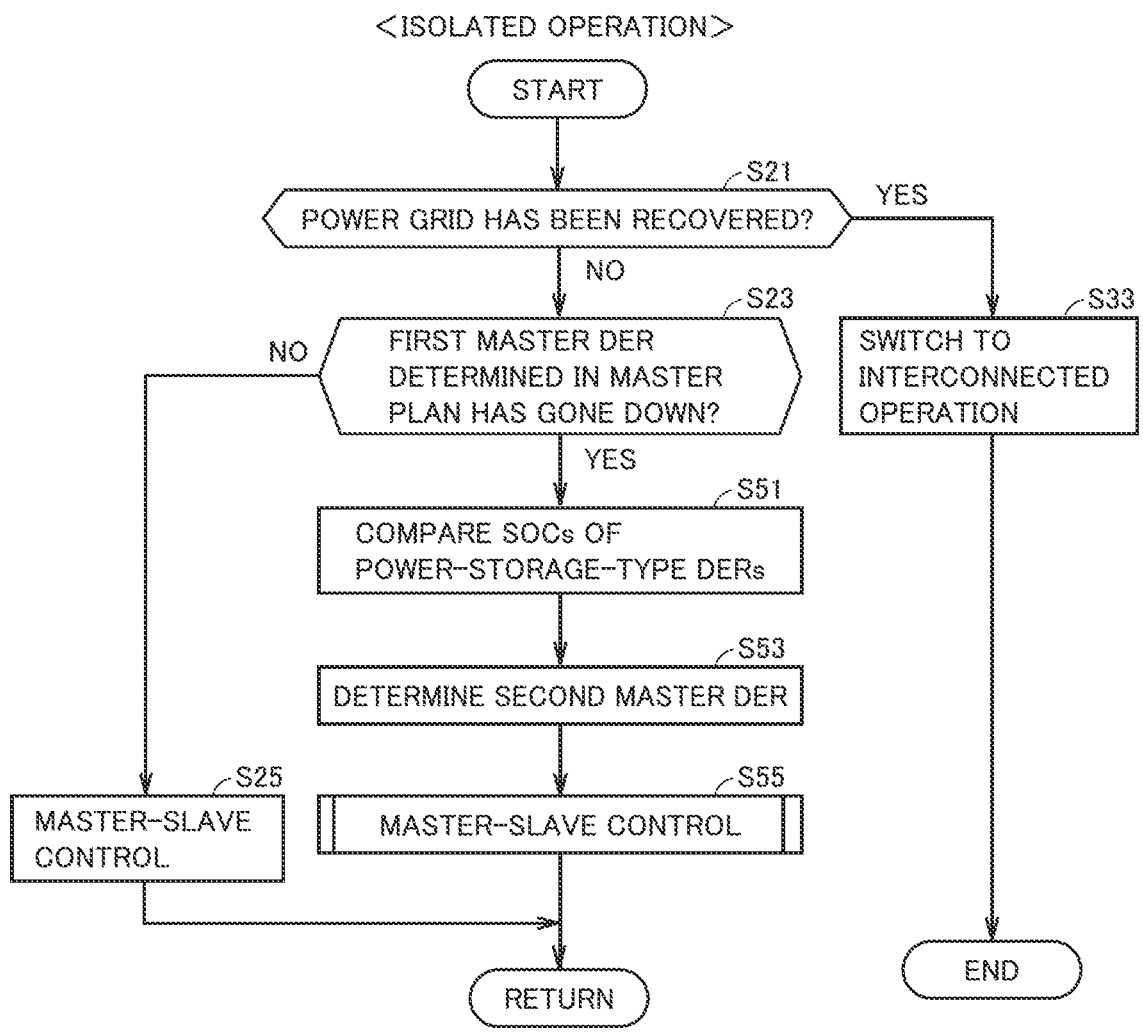
FIG. 6 is a flowchart showing a procedure of a process performed by a CEMS server during an isolated operation of a microgrid in Modification 1.

FIG. 6 is a flowchart showing a procedure of a process performed by CEMS server 100 during the isolated operation of microgrid MG in Modification 1. The process of the flowchart shown in FIG. 6 is repeatedly performed for each prescribed control cycle by CEMS server 100 during the isolated operation of microgrid MG.

The flowchart of FIG. 6 is obtained by replacing processing of S27, processing of S29, and processing of S31 of the flowchart of FIG. 4 with processing of S51, processing of S53, and processing of S55, respectively. Any other processing of the flowchart of FIG. 6 is similar to the processing of the flowchart of FIG. 4, and accordingly, is denoted by the same step number and will not be described repeatedly.

At S23, when determining that the first master DER has gone down (YES at S23), CEMS server 100 moves the process to S51.

At S51, CEMS server 100 compares the SOCs of the power-storage-type DERs set as slaves in order to select a master that is to replace the first master DER. CEMS server 100 can obtain the SOC of each power-storage-type DER with reference to the resource information in storage 120 (FIG. 2).

At S53, CEMS server 100 selects, as a master, a DER with the highest SOC among power-storage-type DERs set as slaves and determines this DER as the second master DER. CEMS server 100 determines DERs other than the second master DER as slaves.

At S55, CEMS server 100 performs master-slave control with the second master DER as a master. Processing of S55 will be described in detail with reference to FIG. 7. Processing of S51 and processing of S53 are performed once or not performed each time a switch is made from the interconnected operation to the isolated operation. In other words, during a continuous isolated operation, processing of S51 and processing of S53 for the second and subsequent times will be skipped.

Figure 7:
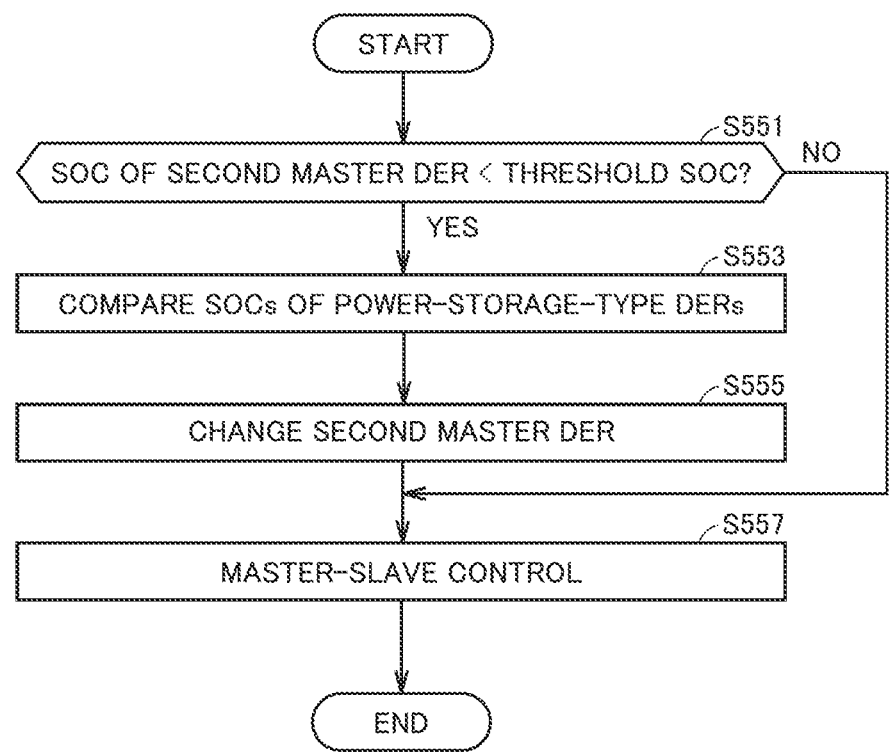
FIG. 7 is a flowchart showing detailed processing of S55 of FIG. 6.

FIG. 7 is a flowchart showing detailed processing of S55 of FIG. 6.

At S551, CEMS server 100 determines whether the SOC of the second master DER has fallen below a threshold SOC. When determining that the SOC of the second master DER has fallen below the threshold SOC (YES at S551), CEMS server 100 moves the process to S553. When determining that the SOC of the second master DER has not fallen below the threshold SOC (NO at S551), CEMS server 100 moves the process to S557.

At S553, CEMS server 100 compares SOCs of power-storage-type DERs set as slaves. CEMS server 100 can obtain the SOC of each power-storage-type DER with reference to the resource information in storage 120 (FIG. 2).

At S555, CEMS server 100 selects, as a master, a DER with the highest SOC among power-storage-type DERs set as slaves and determines this DER as a second master DER in place of the DER currently set as the second master DER. CEMS server 100 determines DERs other than the second master DER as slaves. CEMS server 100 also determines, as a slave, the DER that has been set as the second master DER.

At S557, CEMS server 100 performs master-slave control. When processing of S557 is performed, the process returns to S55 of FIG. 6, and the process proceeds to RETURN.

In Modification 1, when the master (first master DER) determined in the master plan goes down in the isolated operation of microgrid MG, CEMS server 100 selects a master (selects a second master DER) from among power-storage-type DERs and performs master-slave control, as described above. A DER with the highest SOC is selected as the second master DER from among the power-storage-type DERs included in DER group 500. As a result, even when the first master DER goes down as in the embodiment, a master can be newly set and master-slave control can be performed or continued. In other words, even when the first master DER goes down, the isolated operation of microgrid MG can be started or continued appropriately.

A DER with the highest SOC is selected as the second master DER among power-storage-type DERs included in DER group 500. As the DER with the highest SOC is selected as the second master DER, master-slave control with the selected DER as the master can be performed for a longer period of time than when a DER lower in SOC is selected as the second master DER.

When the SOC of the second master DER falls below the threshold SOC in master-slave control, CEMS server 100 selects a DER with the highest SOC as a new second master DER from among power-storage-type DERs included in DER group 500. The isolated operation of microgrid MG can thus be continued appropriately without stopping the isolated operation of microgrid MG.

[Modification 2]

In the embodiment and Modification 1, the second master DER is selected from among power-storage-type DERs included in DER group 500. Alternatively, the second master DER may be selected from among power-storage-type DERs and power-generation-type DERs included in DER group 500.

CEMS server 100 selects the second master DER, for example, based on an amount of available electric power. Specifically, CEMS server 100 selects a DER largest in the amount of available electric power as the second master DER from among power-storage-type DERs and power-generation-type DERs included in DER group 500.

For example, in BEV 11, the amount of available electric power is a remaining capacity of battery B1. In ESS 60, the amount of available electric power is a value of the remaining capacity of the battery. In FCEV 12, the amount of available electric power is a value of an amount of electric power that can be generated by generator H2 and the remaining capacity of battery B2. The amount of electric power that can be generated by generator H2 may be calculated, for example, based on the remaining amount of hydrogen in generator H2 and the power generation efficiency of generator H2. In FCS 70, the amount of available electric power is a value of electric power that can be generated by FCS 70. The amount of electric power that can be generated by FCS 70 may be calculated, for example, based on the remaining amount of hydrogen in hydrogen tank 71 and the power generation efficiency of FCS 70.

During the isolated operation of microgrid MG, when the first master DER goes down, CEMS server 100 selects a second master DER that is to replace the first master DER. At this time, CEMS server 100 selects, as a master, a DER largest in the amount of available electric power among power-storage-type DERs and power-generation-type DERs and determines this DER as a second master DER. CEMS server 100 determines other DERs of DER group 500 as slaves. CEMS server 100 then performs master-slave control.

CEMS server 100 further monitors the amount of available electric power of the second master DER during master-slave control. When the amount of available electric power of the second master DER decreases to the threshold amount of electric power, CEMS server 100 changes the second master DER to any other DER. The threshold amount of electric power is a threshold for determining whether the DER selected as the second master DER can continue an operation. Specifically, when the amount of available electric power of the second master DER falls below the threshold amount of electric power, isolated operation unit 117 of CEMS server 100 selects, as the second master DER, a power-storage-type DER or power-generation-type DER largest in the amount of available electric power among the slaves. At this time, isolated operation unit 117 changes the DER that has been selected as the second master DER (the DER, the amount of available electric power of which has fallen below the threshold amount of electric power) to a slave. Even when the amount of available electric power of the second master DER decreases, thus, the isolated operation of microgrid MG can be continued appropriately. Even when the amount of available electric power of the second master DER decreases, thus, the isolated operation of microgrid MG can be continued appropriately.

The amount of electric power required for continuing an operation can vary depending on DERs. The threshold amount of electric power may be set for each DER based on the amount of electric power required for continuing an operation.

Even with the configuration in which the second master DER is selected from among power-storage-type DERs and power-generation-type DERs included in DER group 500, effects similar to those of the embodiment and Modification 1 can be achieved, as described above.

[Modification 3]

The embodiment and Modifications 1 and 2 have described electric power control of microgrid MG. The present disclosure, however, can be used in electric power control of an FEMS and electric power control of a BEMS, in addition to electric power control of microgrid MG.

For example, it suffices that when the present disclosure is used in electric power control of an FEMS, the function of CEMS server 100 which has been described in the embodiment is included in an FEMS server. Then, power-storage-type DERs included in the FEMS, for example, BEV 11 and FCEV 12 can be selected as the second master DER. It suffices that when the present disclosure is used in electric power control of a BEMS, the function of CEMS server 100 which has been described in the embodiment is included in a BEMS server. Then, power-storage-type DERs included in the BEMS, for example, BEV 11 and FCEV 12 can be selected as the second master DER.

Although the present disclosure has been described and illustrated in detail, it is clearly understood that the same is by way of illustration and example only and is not to be taken by way of limitation, the scope of the present disclosure being interpreted by the terms of the appended claims.

What is claimed is:

1. An electric power system comprising:
a plurality of power adjustment resources electrically connected to a first power grid; and
a management apparatus that manages electric power of the first power grid, wherein
the first power grid is configured to be connected to and disconnected from a second power grid,
when the first power grid is connected to the second power grid and performs an interconnected operation with the second power grid, the management apparatus performs current control of the plurality of power adjustment resources to be synchronized with a frequency of the second power grid,
when the first power grid is disconnected from the second power grid and performs an isolated operation, the management apparatus determines a prescribed power adjustment resource as a master, determines power adjustment resources other than the prescribed power adjustment resource as slaves, and performs master-slave control of the plurality of power adjustment resources, the prescribed power adjustment resource being a power adjustment resource determined in advance among the plurality of power adjustment resources, and
when the prescribed power adjustment resource fails to operate in the isolated operation of the first power grid, the management apparatus determines the master from among the plurality of power adjustment resources based on information about an amount of electric power of the plurality of power adjustment resources, determines, as slaves, power adjustment resources other than the master determined, and performs the master-slave control of the plurality of power adjustment resources.

2. The electric power system according to claim 1, wherein
the information about an amount of electric power is information indicating a current power storage capacity, and
in the master-slave control, the management apparatus determines, as the master, a power adjustment resource with a highest power storage capacity among the plurality of power adjustment resources and determines, as slaves, power adjustment resources other than the master determined.

3. The electric power system according to claim 2, wherein in the master-slave control, when a power storage capacity of the master falls below a threshold capacity, the management apparatus determines, as a new master, a slave with a highest power storage capacity among the slaves and determines, as a slave, a power adjustment resource that has served as the master.

4. The electric power system according to claim 1, wherein
the information about an amount of electric power is information indicating an SOC, and
in the master-slave control, the management apparatus determines, as the master, a power adjustment resource with a highest SOC among the plurality of power adjustment resources and determines, as slaves, power adjustment resources other than the master determined.

5. The electric power system according to claim 4, wherein in the master-slave control, when an SOC of the master falls below a threshold SOC, the management apparatus determines, as a new master, a slave with a highest SOC among the slaves and determines, as a slave, a power adjustment resource that has served as the master.

6. A server that manages electric power of a first power grid electrically connected with a plurality of power adjustment resources,
the first power grid being configured to be connected to and disconnected from a second power grid,
the server comprising:
a storage that stores information about an amount of electric power of the plurality of power adjustment resources; and
a controller, wherein
when the first power grid is connected to the second power grid and performs an interconnected operation with the second power grid, the controller performs current control of the plurality of power adjustment resources to be synchronized with a frequency of the second power grid,
when the first power grid is disconnected from the second power grid and performs an isolated operation, the controller determines a prescribed power adjustment resource as a master, determines power adjustment resources other than the prescribed power adjustment resource as slaves, and performs master-slave control of the plurality of power adjustment resources, the prescribed power adjustment resource being a power adjustment resource determined in advance among the plurality of power adjustment resources, and
when the prescribed power adjustment resource fails to operate in the isolated operation of the first power grid, the controller determines the master from among the plurality of power adjustment resources based on the information about an amount of electric power, determines, as slaves, power adjustment resources other than the master determined, and performs the master-slave control of the plurality of power adjustment resources.

* * * * *